US011120260B2

(12) United States Patent
Guglielmo

(10) Patent No.: US 11,120,260 B2
(45) Date of Patent: Sep. 14, 2021

(54) MULTISCOPIC WHITETAIL SCORING GAME CAMERA SYSTEMS AND METHODS

(71) Applicant: Kennon Guglielmo, San Antonio, TX (US)

(72) Inventor: Kennon Guglielmo, San Antonio, TX (US)

(*) Notice: Subject to any disclaimer, the term of this patent is extended or adjusted under 35 U.S.C. 154(b) by 0 days.

(21) Appl. No.: 16/846,645

(22) Filed: Apr. 13, 2020

(65) Prior Publication Data

US 2020/0242327 A1    Jul. 30, 2020

Related U.S. Application Data

(63) Continuation of application No. 15/397,702, filed on Jan. 3, 2017, now Pat. No. 10,621,433, which is a
(Continued)

(51) Int. Cl.
*G06K 9/00* (2006.01)
*H04N 13/243* (2018.01)
(Continued)

(52) U.S. Cl.
CPC .......... *G06K 9/0063* (2013.01); *A01K 29/005* (2013.01); *A01M 31/002* (2013.01);
(Continued)

(58) Field of Classification Search
CPC ............. G06K 9/0063; G06K 9/00362; H04N 13/243; H04N 13/275; H04N 5/2251;
(Continued)

(56) References Cited

U.S. PATENT DOCUMENTS 6,974,373 B2    12/2005  Kriesel
7,037,198 B2 *   5/2006  Hameen-Anttila ..........
                                           H04N 21/25808
                                                   340/323 R
(Continued)

OTHER PUBLICATIONS

Brown, Justin & Gehrt, Stanley D., The Basics of Using Remote Cameras to Monitor Wildlife, The Ohio State University Extension Fact Sheet Agriculture and Natural Resources, 2009, pp. 1-8, W-21-09, The Ohio State University.
(Continued)

*Primary Examiner* — Dramos Kalapodas
(74) *Attorney, Agent, or Firm* — William H. Quirk; Jesse L. Frizzell; Rosenthal Pauerstein Sandoloski Agather, LLP

(57) ABSTRACT

A game scoring camera system is disclosed for capturing images of game animals for the purpose of scoring the antlers using an accepted scoring method. One or more cameras are used in a multiscopic arrangement for capturing two-dimensional (2-D) images which are then converted to three-dimensional (3-D) data models, the resulting 3-D data models being used for determining measurements of various antler structures for calculating a score for the set of antlers captured in the images, the score being based on existing antler scoring systems. Some embodiments include one or more cameras, each being mounted on an unmanned aerial vehicle or drone, for capturing images during an aerial survey of game animals located within a particular area. Other embodiments include at least two cameras mounted in a stationary configuration for capturing images of game animals located within a particular area.

14 Claims, 7 Drawing Sheets

Related U.S. Application Data continuation-in-part of application No. 15/383,826, filed on Dec. 19, 2016, now abandoned.

(60) Provisional application No. 62/273,682, filed on Dec. 31, 2015, provisional application No. 62/269,334, filed on Dec. 18, 2015.

(51) Int. Cl.

| | | |
|---|---|---|
| *H04N 5/225* | (2006.01) | |
| *A01K 29/00* | (2006.01) | |
| *A01M 31/00* | (2006.01) | |
| *B64C 39/02* | (2006.01) | |
| *G06T 7/60* | (2017.01) | |
| *H04N 13/275* | (2018.01) | |

(52) U.S. Cl.
CPC .............. *B64C 39/024* (2013.01); *G06T 7/60* (2013.01); *H04N 5/2251* (2013.01); *H04N 13/243* (2018.05); *H04N 13/275* (2018.05); *B64C 2201/127* (2013.01); *G06T 2207/10012* (2013.01)

(58) Field of Classification Search
CPC ......... H04N 2013/0081; H04N 13/221; H04N 13/239; A01K 29/005; A01M 31/002; B64C 39/024; B64C 2201/127; G06T 7/60; G06T 2207/10012; G06T 7/579; G06T 2207/10032

See application file for complete search history.

(56) References Cited

U.S. PATENT DOCUMENTS

| | | | |
|---|---|---|---|
| 7,399,220 B2 | 7/2008 | Kriesel et al. | |
| 7,711,151 B2 * | 5/2010 | Jurk ....................... | G06Q 10/00 382/110 |
| 8,346,578 B1 * | 1/2013 | Hopkins, III .......... | G06Q 50/16 705/4 |
| 8,355,885 B2 * | 1/2013 | Krien ..................... | G01B 11/22 702/155 |
| 8,421,846 B2 | 4/2013 | Nelson et al. | |
| 8,998,085 B2 * | 4/2015 | McHale ................... | F41G 1/38 235/400 |
| 9,063,544 B2 * | 6/2015 | Vian ....................... | G01S 17/89 |
| 9,198,363 B2 * | 12/2015 | Vian ....................... | A01G 23/00 |
| 9,621,739 B2 * | 4/2017 | Krien ..................... | A63F 13/655 |
| 9,989,357 B2 * | 6/2018 | Heidemann ............ | G01B 11/24 |
| 10,526,086 B2 * | 1/2020 | Micros .................. | B64C 33/025 |
| 10,586,464 B2 * | 3/2020 | Dupray ............. | H04B 7/18504 |
| 2011/0043613 A1 | 2/2011 | Rohaly et al. | |
| 2011/0311109 A1 * | 12/2011 | Demarais .............. | G06T 7/0012 382/110 |
| 2013/0215229 A1 | 8/2013 | Yerli | |
| 2015/0055937 A1 | 2/2015 | Van Hoff et al. | |
| 2015/0172545 A1 | 6/2015 | Szabo et al. | |

OTHER PUBLICATIONS

Hamrick, B., Strickland, B., Demarais, S., McKinley, W., Griffin, B., Conducting Camera Surveys to Estimate Population Characteristics of White-Tailed Deer, Mississippi State University Extension Service Publication 2788, 2013, pp. 1-24.

Ridenour, Karen & Gray, Rich, Using Trail Cameras to Understand Fire Behavior, Fire Management Today, vol. 70, No. 3, 2010, pp. 37-41, Forest Service of the United States Department of Agriculture, Washington D.C.

Nath, Sumit K., Wavelet-Based Scalable Coding of Still and Time-Varying Stereoscopic Imagery, Doctoral Thesis, University of Ottawa School of Information Technology and Engineering, Jun. 2004.

\* cited by examiner

MULTISCOPIC WHITETAIL SCORING GAME CAMERA SYSTEMS AND METHODS

CLAIM OF PRIORITY TO PRIOR APPLICATION

This application is a continuation of U.S. patent application Ser. No. 15/397,702, filed on Jan. 3, 2017, entitled "Multiscopic Whitetail Scoring Game Camera Systems and Methods," which is a continuation-in-part of U.S. Non-Provisional application Ser. No. 15/383,826, filed on Dec. 19, 2016, entitled "Multiscopic Whitetail Scoring Gamer Camera System Using Tandem Drones," which claims the benefit of the filing date of U.S. Provisional Application, Ser. No. 62/269,334, filed on Dec. 18, 2015, entitled "Multiscopic Whitetail Scoring Game Camera," and U.S. Provisional Application, Ser. No. 62/273,682, filed on Dec. 31, 2015, entitled "Multiscopic Whitetail Scoring Game Camera System Using Tandem Drones." By this reference, the entire disclosures, including the claims and drawings, of the above-identified applications are hereby incorporated by reference into the present disclosure as though set forth in their entirety.

BACKGROUND OF THE INVENTION

Technical Field

The present invention relates to hunting and wildlife management, especially to whitetail deer management and scoring. More particularly, many aspects of to game cameras for use in management and scoring of whitetail deer, antelope and other horned members of the Bovidae family.

Background Art

The management of whitetail deer can be very important to the owners of a property, and yet is also very costly if it is to be done correctly. Having an accurate understanding of the current whitetail deer population on a particular property is critical for managing the population. An accurate understanding is difficult to obtain, largely because most management programs depend on remote observation of the population, such that they rely on subjective estimates and speculative exploitations. Despite the challenges, once a property's overall deer population is well understood through game surveys and observation, rules are often developed about the type of whitetail deer that can be hunted for optimum management of the population, although such rules can be difficult to adhere to.

Many have developed and used game cameras that can be very useful tools in monitoring whitetail deer populations. Indeed, some have long utilized images from game cameras for scoring whitetail deer. One example of such a system is known as the Buck Score System, aspects of which are described in U.S. Pat. No. 8,483,446. However, the images captured are often difficult to judge as to scale. Errors are therefore common, and the resulting scores are estimates at best.

Although ground-based cameras are limited to capturing images within the immediate vicinity in which the cameras are set up and/or mounted, systems and methods for employing ground-based cameras can be useful based at least in part on proper configurations. By using unmanned aerial vehicles (UAV) or drones having cameras mounted thereon, a thorough survey of a larger area can be completed expeditiously. Many have therefore long needed better systems for minimizing guesswork in monitoring the whitetail deer populations in a particular given area.

SUMMARY OF THE INVENTION

The present disclosure is directed to improving upon the prior art and providing better systems and methods for those managing whitetail deer populations. One disclosed embodiment includes two cameras, each of which is mounted onto a drone. Each camera operates to capture two-dimensional (2-D) images of whitetail deer antlers during an aerial survey of a particular area. These 2-D images are used to generate a three-dimensional (3-D) data model of the whitetail deer antlers. Using techniques such as photogrammetry, the 3-D data model is then used to obtain measurements of particular portions of the whitetail deer antlers, particularly those portions which are used for generating an antler score using accepted scoring criteria. When two drones are employed in the disclosed system, the drones are preferably flown in tandem fashion, but also may be flown independently of one another while capturing images in some embodiments.

Although many of the details of such a system are described using two cameras, each mounted to a separate drone, other embodiments may include a single camera mounted on a single drone, wherein the single camera captures multiple images of the antlers of a whitetail deer, preferably from multiple angles for ultimately generating a 3-D model as herein described.

Other disclosed embodiments include two or more cameras, each mounted in a stationary position in a ground-based camera system. These cameras are utilized similarly to the drone-based camera system in that each camera captures one or more images of the antlers of a whitetail deer for generating a 3-D data model of the antlers, extrapolating measurements of relevant portions of the antlers, and calculating a score for the antlers using accepted scoring criteria.

BRIEF DESCRIPTION OF THE SEVERAL VIEWS OF THE DRAWINGS

For a more complete understanding of the present invention and its preferred embodiments, and the advantages thereof, reference is now made to the following descriptions taken in conjunction with the accompanying drawings, in which.

DETAILED DESCRIPTION OF ILLUSTRATIVE EMBODIMENTS

The following examples are included to demonstrate preferred and alternative embodiments. It should be appreciated by those of ordinary skill in the art that the techniques disclosed in these examples are thought to represent techniques that function well in the practice of various embodiments, and thus can be considered to constitute preferred modes for their practice. However, in light of the present disclosure, those of ordinary skill in the art should appreciate that many changes can be made in the specific embodiments which are disclosed while still obtaining a like or similar result without departing from the spirit and scope of the invention.

For purposes of these descriptions, a few wording simplifications should also be understood as universal, except to the extent otherwise clarified in a particular context either in the specification or in any claims. The use of the term "or" in the specification is used to mean "and/or" unless explicitly indicated to refer to alternatives only, or unless the alternatives are inherently mutually exclusive. When referencing values, the term "about" is used to indicate an approximate value, general one that includes the standard deviation of error for any particular embodiments that are disclosed or that are commonly used for determining such value. "A" or "an" may mean one or more, unless clearly indicated otherwise. Such "one or more" meanings are most especially intended when references are made in conjunction with open-ended words such as "having," "comprising," or "including."

Furthermore, throughout the disclosure where reference is made to "image" with reference to the operation of one or more cameras, it should be understood that this may refer to one or both of a still image or video image when such a meaning is not explicitly indicated.

Game Scoring Camera System Using One or More Drones.

Figure 1:
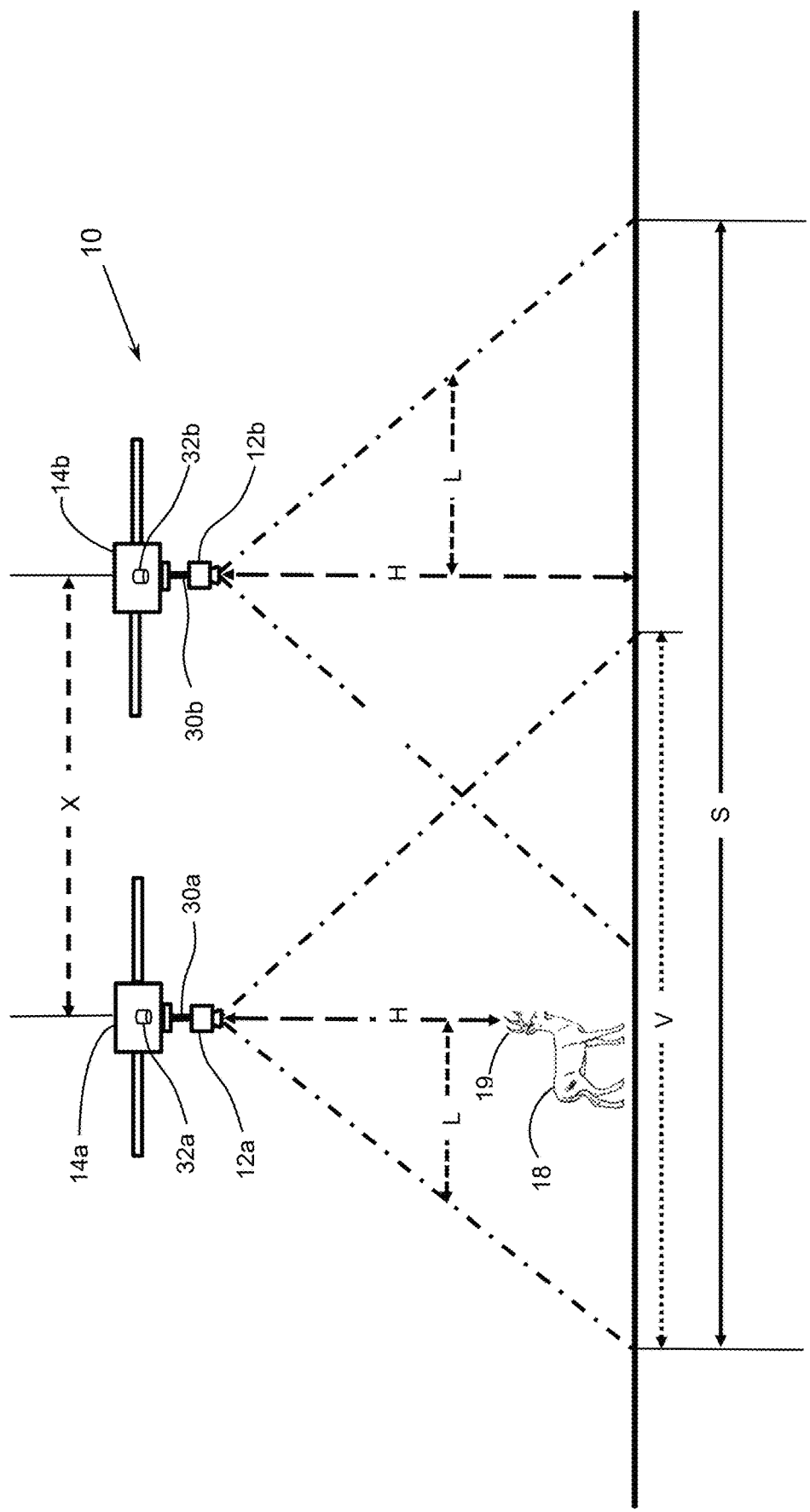
FIG. 1 illustrates a view of various components of system 10, which represents a first preferred embodiment, as operatively deployed for aerially monitoring whitetail buck 18 and any other deer in a particular area.

Reference is first made to FIG. 1 showing one example of system 10 and its general components. In some preferred embodiments, at least two cameras 12a, 12b are separately mounted on unmanned aerial vehicles ("UAV" or "drone") 14a, 14b. Cameras 12a, 12b are used for capturing video and/or still images of a target 18 within the field of view of either or both cameras 12a, 12b. Target 18 is preferably a member of the Cervidae family, more preferably a whitetail deer. In some preferred embodiments, cameras 12a, 12b are capable of capturing both visible and infrared images. Whitetail deer are known to bed down at particular times of the day, typically selecting areas which may result in the deer being out of the visible field of view of cameras 12a, 12b because of external obstructions such as vegetation. For this purpose, cameras 12a, 12b preferably have the capability of capturing infrared images to alleviate any issues with structures obstructing the visible field of view of cameras 12a, 12b, therefore allowing for subsequent capture and reconstruction of such images into a three-dimensional (3-D) data model for scoring antlers 19 of target 18. Cameras 12a, 12b are preferably high-resolution digital cameras as that designation would be understood by those of ordinary skill in the art. A preferred minimum resolution suggested for high-resolution cameras is 12 MP (Mega Pixels).

Spaced configurations of cameras 12a, 12b, as well as the drone 14a, 14b to which each is mounted, are such that the distance between them is known and kept relatively constant during image capture. In other words, drones 14a, 14b are controlled in a synchronous flight pattern throughout most or all of an aerial survey. Maintaining this known distance between cameras 12a, 12b assists in developing a 3-D data model from the images captured by cameras 12a, 12b, as will be discussed in further detail below. Drones 14a, 14b preferably are also programmed to remain a fixed distance from one another during a survey flight, such distance being indicated by the letter X in FIG. 1. In preferred embodiments, X is equal to the distance value which provides the most optimal positioning of cameras 12a, 12b for capturing usable images for resolving dimensions when capturing images along a flight path. The optimal distance between the cameras 12a, 12b (or between two image capture locations when only one drone is used, as in some alternatives) is preferably determined based on optical quality and the terrain, and may be automatically or selectively variable during the flight path.

As illustrated in FIG. 1, the value of S, which represents the swath distance, is further defined as the extent of the combined field of view of both cameras 12a, 12b viewing the ground in a tandem or stereoscopic view. The programmed flight path and associated pattern of flight, described in more detail below, is determined in part on the value of S. Also shown in FIG. 1, the letter V represents the field of view of one of cameras 12a, 12b.

Drones 14a, 14b are also pre-programmed to fly at a particular altitude or height from the target 18, represented by the letter H in FIG. 1. The height at which drones 14a, 14b travel while capturing usable images for subsequent 3-D data modeling may be predetermined or may be calculated based on topographic map data of the terrain within the area in which an aerial survey will cover. If no topographic map data is available, one or more position sensors 32a, 32b, including optical, laser, photoelectric, infrared, ultrasonic, Light Detection and Ranging (LIDAR), etc., may be incorporated and mounted on drones 14a, 14b, both to sense the altitude to maintain the optimal height while also preventing any accidental encounter with structures, trees, or hills and the like, as well as to aid with determining scale with respect to target 18 in captured images, as described in more detail below.

When system 10 is operated over relatively flat terrain, drones 14a, 14b may be programmed to remain at one particular height H for the duration of the operation, wherein H is an optimal height for capturing accurate, substantially detailed, and usable two-dimensional (2-D) images. Generally, the value of H is related or proportional to the values of S and X. In some embodiments, the value of H is equal to the value of S and/or X. Lateral distance between one camera and the swath edge is represented by L in FIG. 1. As with height H, L is generally proportional to the value of S and X. It should be understood that the apparent relative values for H, L, S, V, and X are not drawn to scale as shown in FIG. 1 but are merely to illustrate the concepts herein described as they relate to an embodiment of the whitetail scoring game camera system.

Drones 14*a*, 14*b* are each equipped with a camera 12*a*, 12*b* for the purpose of capturing video and/or still images during an aerial survey of the population of targets 18 present within a designated area. Drones 14*a*, 14*b* are preferably programmed using a developer pack or software kit for performing as described herein. In accordance with preferred programming, drones 14*a*, 14*b* fly in a tandem or synchronized flight pattern while capturing images of target 18 for the purpose of scoring the antlers 19 using a scoring system such as the Boone and Crocket Club® scoring system (as described in more detail below) or other like systems for scoring whitetail deer antlers 19. Cameras 12*a*, 12*b* are shown in FIG. 1 mounted on drones 14*a*, 14*b* for capturing usable images in a stereoscopic method for ultimately creating a 3-D data model from the captured 2-D images.

In preferred embodiments, images are captured continuously in real time throughout the flight of drones 14*a*, 14*b*. Such image capturing is preferably performed wherein operation of cameras 12*a*, 12*b* is synchronized such that both cameras 12*a*, 12*b* simultaneously capture images during flight. In other embodiments, system 10 may be adapted such that a person on the ground can manually capture discrete images during flight while being able to see the view of each of cameras 12*a*, 12*b*. Such ground-based manual control systems may include a First Person View (FPV) system incorporating real-time camera views from the perspective of drones 14*a*, 14*b*, and whereby a person remotely pilots drones 14*a*, 14*b* using a radio control system.

As shown in FIG. 1, mounting of cameras 12*a*, 12*b* to drones 14*a*, 14*b* is achieved using known methods for attachment. As an example, cameras 12*a*, 12*b* are preferably mounted to drones 14*a*, 14*b* through use of gimbals 30*a* and 30*b*, respectively. In preferred embodiments, gimbals 30*a*, 30*b* are three-axis gimbals which stabilize cameras 12*a*, 12*b* during flight in three axes, namely yaw, pitch, and roll. Use of three-axis gimbals stabilizes the position of cameras 12*a*, 12*b*, which accordingly stabilizes the images captured, resulting in more clear images for 3-D data modeling. Other embodiments of system 10 may employ two-axis gimbals for mounting cameras 12*a*, 12*b* to drones 14*a*, 14*b*, drone stabilization software without using gimbals, or other known methods of attachment.

Each of the cameras 12*a*, 12*b* is arranged in a strategic mounting configuration for capturing usable images of a target 18, wherein target 18 is preferably an antlered game animal of the Cervidae family, most preferably whitetail deer as shown in FIG. 1. Target 18 may also be horned members of the Bovidae family which include antelope.

Figure 5A:
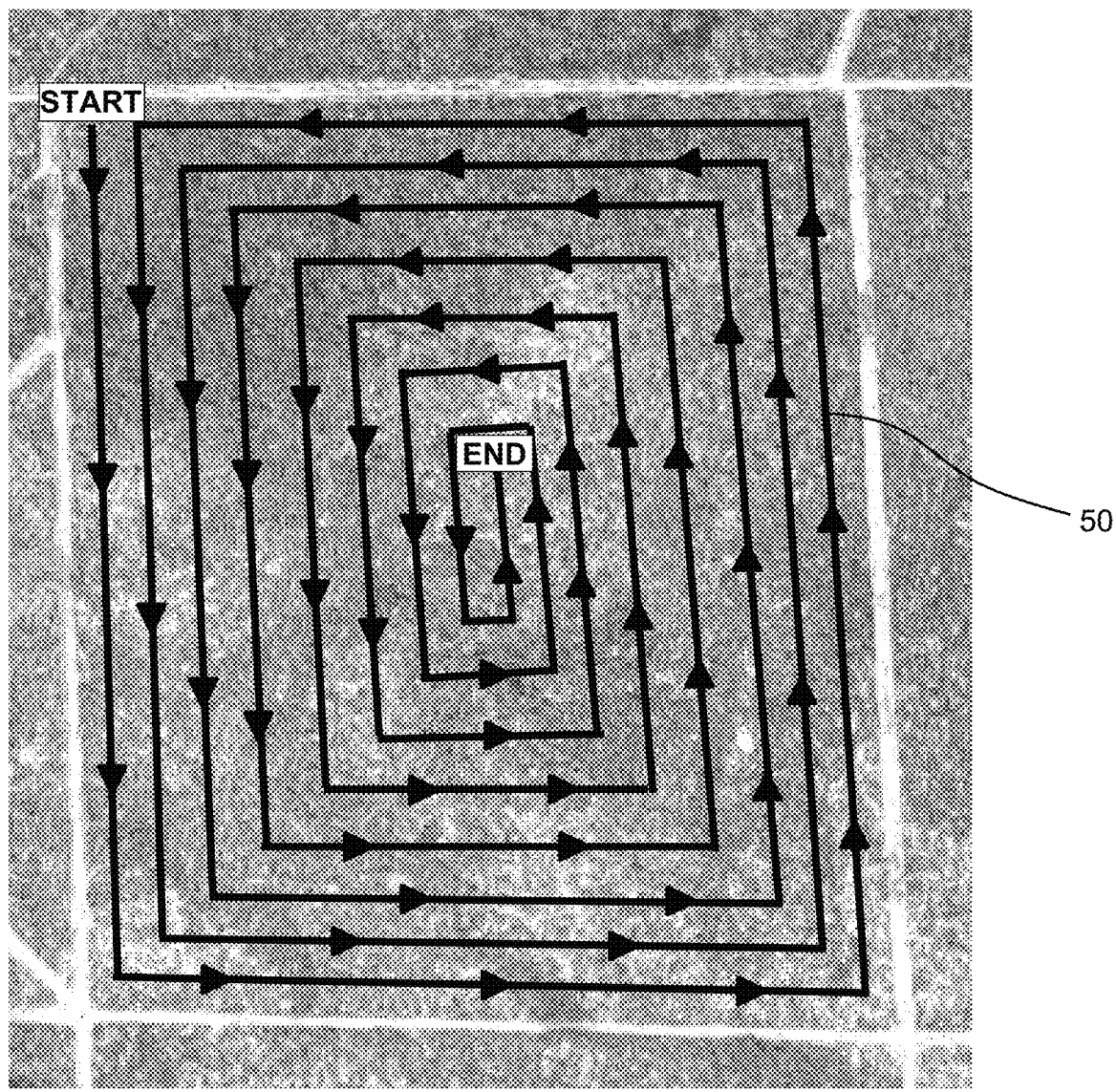
FIG. 5A is a screenshot of a map image showing one example of a serpentine flight path 50 for capturing images in a survey of one or more targets 18 in a particular area.
Figure 5B:
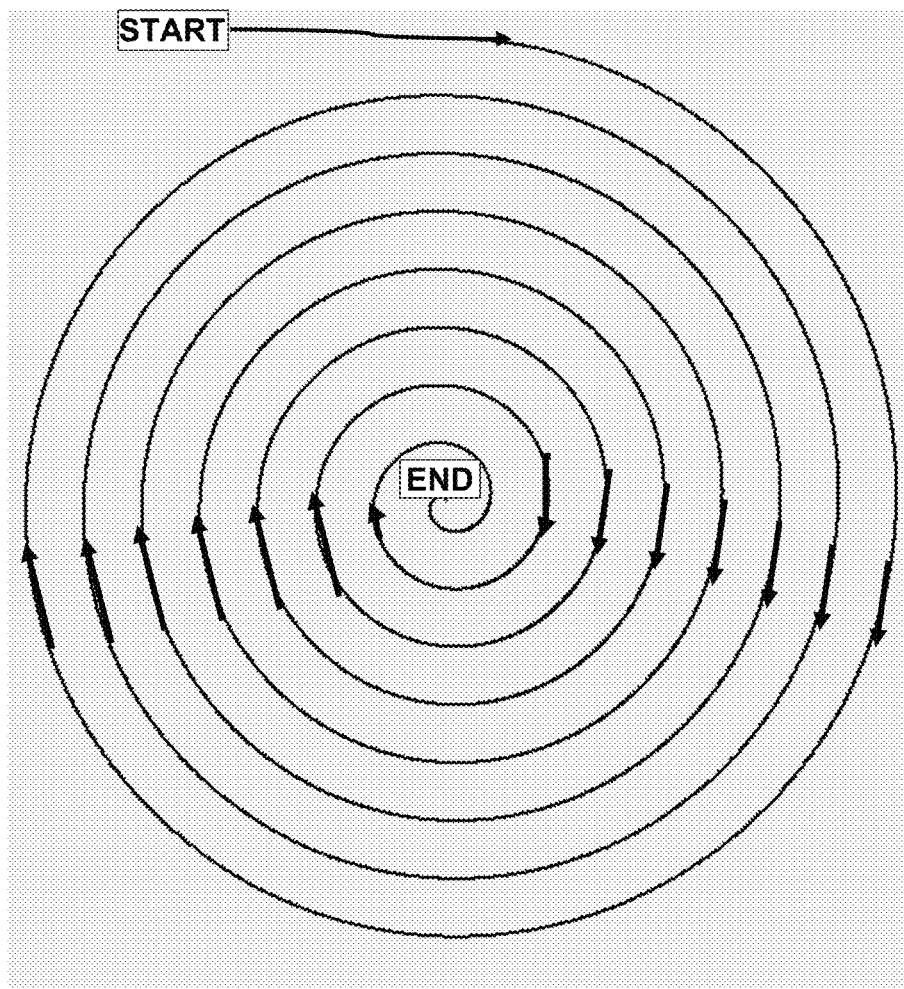
FIG. 5B is a screenshot of a map image showing one example of a spiral flight path 50 for capturing images in a survey of one or more targets 18 in a particular area.

In some preferred embodiments, drones 14*a*, 14*b* are preprogrammed and synchronized to fly in tandem on a particular flight path, preferably using Global Positioning System (GPS) data. Particularly, flight paths may be generated using GPS waypoints in which particular points along the preferred flight path are selected such that drones 14*a*, 14*b* travel to each waypoint in a flight path pattern, wherein such flight pattern is determined to provide the optimal aerial coverage of the area to be surveyed. One non-limiting example of a flight path 50 is shown in FIG. 5A, which is a screenshot of an aerial map view of a property. As shown in FIG. 5A, the flight path may be a serpentine path in which the swaths along each leg of the path have no overlap. In some embodiments, overlap of the swaths along a particular flight path may be implemented in order to provide optimal aerial coverage for the intended survey. In the example shown in FIG. 5A, flight path 50 starts near one corner of the property and then initially travels along the perimeter of the property. Flight path 50 is shown to continue in a serpentine rectangular pattern until the middle of the property has been reached by drones 14*a*, 14*b* and most or all of the property has been appropriately surveyed. FIG. 5B shows an example of a spiral flight path such as would be preferred for capturing images in a circular area. It will be understood by those of ordinary skill in the art that other patterns for flight path 50 may be implemented, based in part on the shape and size of the area to be surveyed. For example, in an area with dense vegetation or a high concentration of deer, a flight pattern with overlap may be preferred to improve measurement accuracy.

Although the above description principally relates to capturing simultaneous image data from two different cameras, each mounted onto a separate drone, in alternative embodiments, what is represented as camera 12*b* mounted on drone 14*b* in FIG. 1 may actually be camera 12*a* mounted on drone 14*a*, just in a different position during its flight, at a corresponding time increment. In other words, one camera mounted on one drone may be used to capture all 2-D images from which a 3-D data model is produced, by capturing and correlating images of the same animal from different vantage points, incrementally over time during the flight. For instance, it is contemplated that if a user of system 10 has confidence that minimal movement of target 18 is possible, minimal movement being defined as movement which is resolvable by system 10 in generating a 3-D data model and does not interfere with the accuracy and resolution of the captured 2-D images, then one camera may be used to capture consecutive images of target 18 from which an accurate 3-D model may be produced in accordance with the methods herein described.

Figure 2:
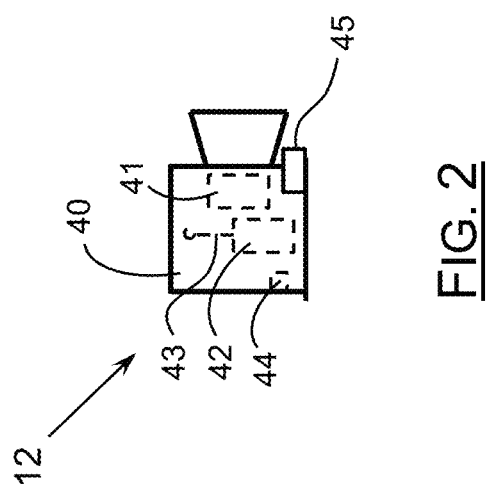
FIG. 2 is an enlarged view of a camera element 12, which is representative of each of the two camera elements 12a, 12b shown in FIG. 1.

Turning now to FIG. 2, there is shown camera 12 along with some of the preferred components of camera 12. One component of camera 12 is camera module 41 which is configured for connection with processor 42, both of which are located within camera housing 40. Processor 42 preferably runs the algorithms necessary for creating 3-D models from the 2-D images captured by camera 12 during flight. In some embodiments, each of the cameras 12*a*, 12*b* contains processor 42. In other embodiments, only one of cameras 12*a* or 12*b* contains a processor 42, while the other camera is capable of wirelessly sending image data to camera 12*a* or 12*b* having processor 42 through Bluetooth, WiFi, cellular networks or other wireless network systems. Having a full complement of system components in only one camera 12*a* or 12*b* is a more affordable and practical option for operating system 10.

In order to maintain wireless communication links between cameras 12*a* and 12*b*, each may utilize a wireless antenna 43 for sending and receiving wireless data signals. Still other embodiments may incorporate a WiFi-enabled memory unit which is capable of wirelessly sending image data from the one camera 12*a* or 12*b* which does not incorporate a processor 42, to the other camera 12*a* or 12*b* having processor 42 for subsequent construction of a 3-D data model of antlers 19 from the captured image data. Processor 42 is preferably a multi-core processor.

Although preferred embodiments have algorithms run by a processor 42 integrated with camera 12 during flight, it is also recognized that alternative embodiments may utilize other separate devices including, but not limited to, mobile devices, personal computers, and the like which contain separate processors for running the algorithms necessary for generation of 3-D data models from the 2-D images captured by camera 12. These captured images may be transferred from camera 12 to a separate computing device in real time during flight via a wireless network connection using wireless antenna 43. Algorithms for generating 3-D data models from 2-D images may be incorporated into such separate devices.

For wired connectivity to other devices, camera 12 has at least one Universal Serial Bus (USB) port 44. Transfer of data (i.e., captured images) may occur via USB port 44 between camera 12 and another device including, but not limited to, a laptop computer, personal computer, tablet, smartphone, and the like, particularly when such other device incorporates the algorithms necessary for generating 3-D data models. Camera 12 may also incorporate a memory device slot 46 for receiving a memory device such as a removable memory card or stick adapted to store captured images, wherein the removable memory card may be connected to a separate device in order to transfer or manipulate the captured images stored thereon.

Cameras 12a, 12b perform by capturing still images and/or video images of target 18. Multiple images are preferred for providing a more accurate image representation for subsequent 3-D data modeling. This provides a greater number of image points which can then be matched across consecutive images for creating a more accurate 3-D data model of target 18, and more particularly a more accurate 3-D data model of antlers 19. Furthermore, consecutively captured images of target 18 should preferably overlap so as to provide maximum coverage of target 18 in the captured images. It is expected that at least a 50% overlap between consecutive images will occur. Preferably, an overlap of approximately 60% or more should occur between consecutively captured images to improve the quality and accuracy of the resulting 3-D data model produced from those images.

Preferably, the captured images include multiple angles and more than one side of target 18 to provide a more detailed and accurate view, particularly of antlers 19. Such captured images can then be used to develop a 3-D data model of the target 18, preferably in real time, more particularly the antlers 19. Generation of a 3-D data model is for the purpose of evaluating the antlers 19 in order to develop a score such as one resulting from the use of the Boone and Crockett Club® scoring system or other similar scoring systems for whitetail deer or other antlered or horned animals such as Safari Club International, Buckmasters Trophy Records, and other like scoring systems.

Aerial use of cameras 12a, 12b preferably results in multiple images capturing all or nearly all sides of target 18 which can provide a multitude of data or image points from which to build a data model of the entire rack of antlers 19. Multiple data or image points are preferred for generating a more accurate 3-D data model of the antlers 19 for scoring purposes. Having a large number of image points over multiple images facilitates the matching of such image points between the multiple images which helps with reconstructing the 2-D images into a 3-D model. In this context, data or image points represent a single point or pixel on a digital image which in turn represents a singular point on the surface of target 18.

It is possible that target 18 may be in motion when cameras 12a, 12b are capturing images thereof. If target 18 is moving, blurred images may result. Additionally, if multiple images are captured and target 18 has moved between consecutively captured images, there could be misalignment of the images. In order to minimize these potential problems, cameras 12a, 12b preferably operate with a fast shutter speed and/or a narrow flash pulse which helps to negate motion blurring.

Additionally, drones 14a, 14b may be in motion while cameras 12a, 12b capture images of target 18. Such motion, which could include forward, backward, and side-to-side motions as well as tilt or yaw motions, must be resolved in order to reduce or eliminate any effects such motion may have on the quality of the captured images. However, in some preferred embodiments, when an animal is detected, the flight of the drones 14a, 14b is automatically slowed or stopped in order to allow for capture of more image data about the detected animal. In other words, drones 14a, 14b can be made to hover over or in the vicinity of target 18 in order to ensure capture of sufficient data and to minimize or even eliminate any motion effects. The preferred mode is to program the drones so that they will automatically hover or adjust speed to maximize the quality of the captured images. An alternate mode is to allow a drone operator to control the entire flight or to interrupt and to adjust movement during a preprogrammed flight path.

Figure 3A:
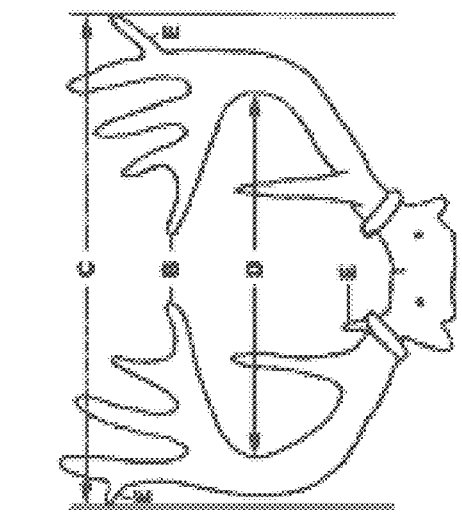
FIGS. 3A and 3B illustrate front and side elevation views, respectively, of the antlers of a target 18, preferably a whitetail deer, identifying various dimensions that are commonly used for scoring the antlers of a whitetail deer, each of which are determined by preferred variations of system 10.
Figure 3B:
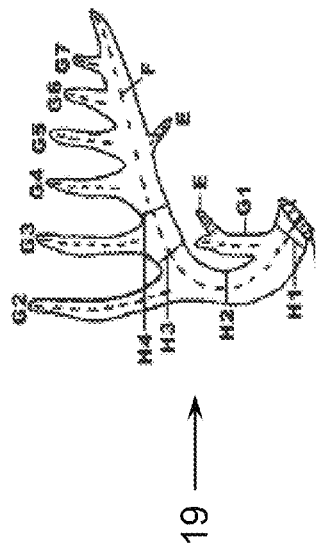

Turning now to FIGS. 3A & 3B, there are shown the typical measurements of antlers 19, some of which are utilized for calculating a score for whitetail deer, particularly in accordance with the Boone and Crockett Club® scoring system. FIG. 3A is a representation of the "spread" measurements of antlers 19 which include: B—measurement between the tips of the main beams (not incorporated into the final score); C—measurement of the greatest spread (not incorporated into a final score); D—measurement of the inside spread of the main beams; and E—the total lengths of all of the abnormal points or tines. Abnormal tines are those which do not qualify as typical tines as defined below. Measurement C is determined by measuring the distance between perpendicular points at a 90° angle to the longitudinal axis of the skull.

Measurement D is determined by measuring the widest distance between the main beams at a 90° angle to the longitudinal axis of the skull.

FIG. 3B is a representation of the length and circumference measurements which are included in determining a final score of a typical whitetail buck 18. Again, E represents the length measurements of all of the abnormal tines on antlers 19. Measurement of the length of the main beam is represented as F in FIG. 3B. G1-G7 illustrate the length measurements of all of the typical points or tines on antlers 19. Typical tines are those that grow in a typical manner and location and which are at least one inch in length and not wider than its length. H1-H4 represent the necessary locations for measuring the circumference of the main beam. Circumference measurements are taken at a 90° angle to the longitudinal axis of the antler at the smallest location between typical tines. Once all of the appropriate measurements are made, these measurements are then added together by processor 42 to calculate a total score for a particular whitetail deer 18.

Figure 4:
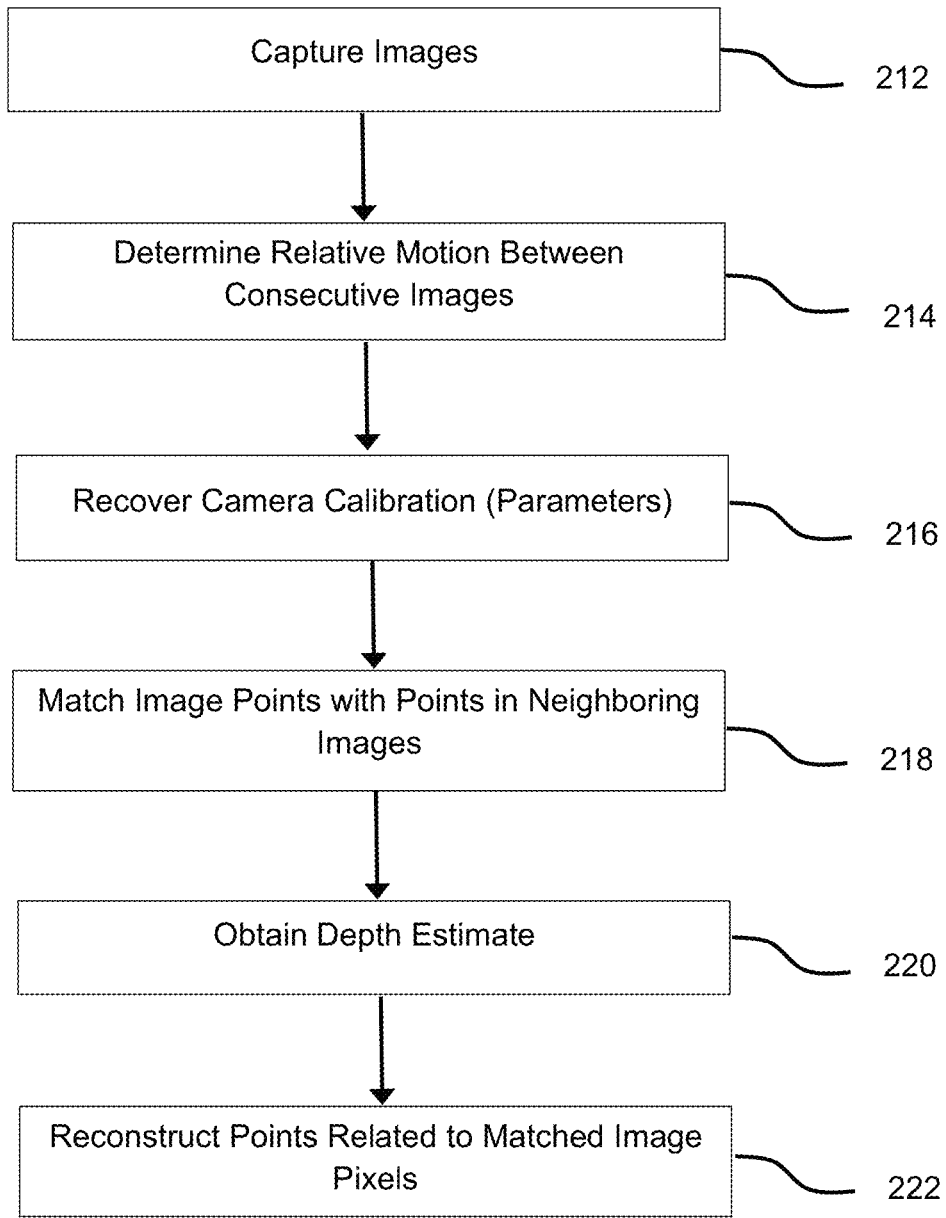
FIG. 4 is flowchart representative of basic operation of system 10.

Since the images captured by cameras 12a, 12b are initially in a 2-D format, the captured images must be processed in order to convert the images to a 3-D data model. FIG. 4 represents one method for processing the 2-D images into a 3-D data model. One or more images consisting of still photographs or video data are captured by each of cameras 12a, 12b in Step 212. Preferably, overlap occurs between consecutively captured images so as to provide the greatest number of image points for matching such points between discrete images, as described herein. Processor 42 then runs the algorithm(s) necessary for creating a 3-D data model from the captured 2-D images.

When multiple images are utilized for generating the 3-D data model, and since target 18 may be moving when the multiple images are captured, Step 214 indicates that the relative motion of target 18 must be resolved between consecutive images. Without employing Step 214, the images may be misaligned which could result in the production of a less accurate 3-D data model.

For generating a 3-D data model from 2-D images, recovery of camera calibration is often preferable, if not required, as indicated in Step 216. Included in camera calibration are the camera's parameters, often referred to as the camera's intrinsic parameters, which are represented by the following: (1) the x-coordinate of the center of projection; (2) the y-coordinate of the center of projection; (3) the focal length; (4) the aspect ratio; and (5) the angle between the optical axes. In some embodiments, the calibration of cameras 12a, 12b may be approximated.

Some embodiments of the present invention preferably incorporate and utilize stereophotogrammetry as a core part of a system and method for generating 3-D models from 2-D images. Stereophotogrammetry is the process that combines multiple overlapping images taken from different cameras to create 3-D models. The images are captured from cameras at different angles in relation to the target, as described for the preferred embodiment.

There are several examples of applicable software for stereophotogrammetry for the preferred embodiments. A relevant example of commercial software for stereophotogrammetry is Microsoft Photosynth®. Photosynth works by first processing each image using an interest point detection and matching algorithm. Applying Photosynth to the present invention, the process can identify specific features such as deer antlers and compare them to the same feature taken in other photographs. Through analysis of the differences in angles and distances of the features in different images, Photosynth can identify the 3-D position of each feature. The second step of Photosynth involves the navigation and display of the 3-D features identified. The Photosynth viewer software allows a user to remotely access and view the 3-D images stored on a server. This technology allows the user to monitor the high-resolution images with smooth zooming without the need to download them to their own personal device. Photosynth is highly applicable to the present invention because it is desirable for users to wirelessly access images while the drones are still in flight.

Another example of relevant software to the present invention is Microsoft Paint 3D. The software will be capable of stereophotogrammetry on computers with the Windows 10 Operating System. Additionally, the software app will be available on Windows 10 phones, iOS, and Android. Applying this to the present invention, cameras can take images of deer, Paint 3D can convert them to 3-D, and allow later editing. The familiarization of many users with Microsoft Paint will likely lead to widespread use of Paint 3D. Photosynth and Paint 3D are only two examples of many that can be used for photogrammetry in preferred embodiments.

If movement of target 18 has occurred between captured images, this could result in a misalignment of pixels from one image to the next. In order to generate a more accurate 3-D data model, Step 218 indicates that the image points or pixels from one image should be matched with the image points or pixels that depict the same features in neighboring or consecutive images, which preferably will minimize the effects of any misalignment. These image points correspond to projection rays passing through the image point and the center of the camera view. Matching multiple image points across consecutive images provides coordinates of the resulting 3-D points, i.e., the X, Y, and Z coordinates for the 3-D points that are reconstructed. One 3-D point can be reconstructed using image points between consecutive images by determining the intersection of the projection rays that correspond to the image points, otherwise known as triangulation. Using this triangulation method, processor 42 is able to then calculate the dimensions of target 18 based on the constructed 3-D data model, including the dimensions of antlers 19 for use in the whitetail scoring method described above.

A critical aspect of 3-D modeling from 2-D images is depth. As is generally understood, in a 2-D image, the two dimensions are length and width. The third dimension, of course, is depth. Depth determination as indicated in Step 220 corresponds with the previous step. In other words, matching pixels across multiple images helps to determine and establish depth for the resulting 3-D data model. Additionally, placing cameras 12a, 12b in a configuration in which the distance between them is a known value, as well as the distance between each camera 12a, 12b and other fixed objects within the field of view of cameras 12a, 12b, further aids in determining depth. Once depth has been determined or estimated and image pixels have been matched over consecutive multiple images, the points related to the matched image pixels can then be combined in order to create the 3-D data model as indicated in Step 222. Techniques for constructing a 3-D model may include, but not be limited to, mesh modeling, curve modeling, digital sculpting, and other known techniques. Once a 3-D data model is constructed, the dimensions necessary for calculating a score for antlers 19 are determined using known photogrammetric and/or metrological techniques.

For scaling the measurements, at least one distance should be known. For example, if an object of known size other than target 18 can be captured in the images, the measurements of antlers 19 can be more accurately determined by having a scale for purposes of comparison by which to determine the needed measurements of antlers 19 for scoring. Another method for calculating scale for generating accurate measurements of antlers 19 is represented by the following: photo scale=f/H, where "f" is equal to the known focal length of cameras 12a, 12b, and H is the height above target 18 determined by position sensors 32a, 32b, as previously discussed. As one example, the known focal length of camera 12a may be 50 millimeters. If H is equal to 20 meters (20,000 millimeters), then the photo scale would be equal to 1/400 (50/20,000) or 1:400.

Once a 3-D data model is completed for a particular target 18, and all measurements are determined for calculating a score for antlers 19, system 10 preferably identifies target 18 as a particular whitetail deer based on observable characteristics. Such observable characteristics preferably include the data gathered related to antler measurements. Since whitetail deer antlers are shed yearly, other observable characteristics are also preferably measured and may be used for identification, such as measurements related to the deer's entire body. Rather than dimensional measurement as such, alternative embodiments may otherwise recognize animal characteristics to distinguish one animal from others, such as through fuzzy logic or image recognition techniques. Regardless of the particular technique for identifying an animal, the identification can then be stored in memory, within the camera or another separate device, for future reference such that if the particular whitetail deer 18 so identified is captured in subsequent images during a later performed survey, system 10 is programmed to recognize the particular identified whitetail deer 18.

It is contemplated that rather than mounting two cameras, each on a separate drone, a single camera could be mounted on a single drone wherein the single camera is capable of capturing 3-D images without a need for generating a 3-D data model.

Game Scoring System Using Stationary Ground-Based Game Cameras.

Those of ordinary skill in the art will understand that the second disclosed embodiment is similar in many respects to the first disclosed embodiment of system 10 as described above. Accordingly, the reference numbers used to describe the parts of the second preferred embodiment are the same but for the number "1" in the hundreds place of the reference numbers, where applicable.

Figure 6:
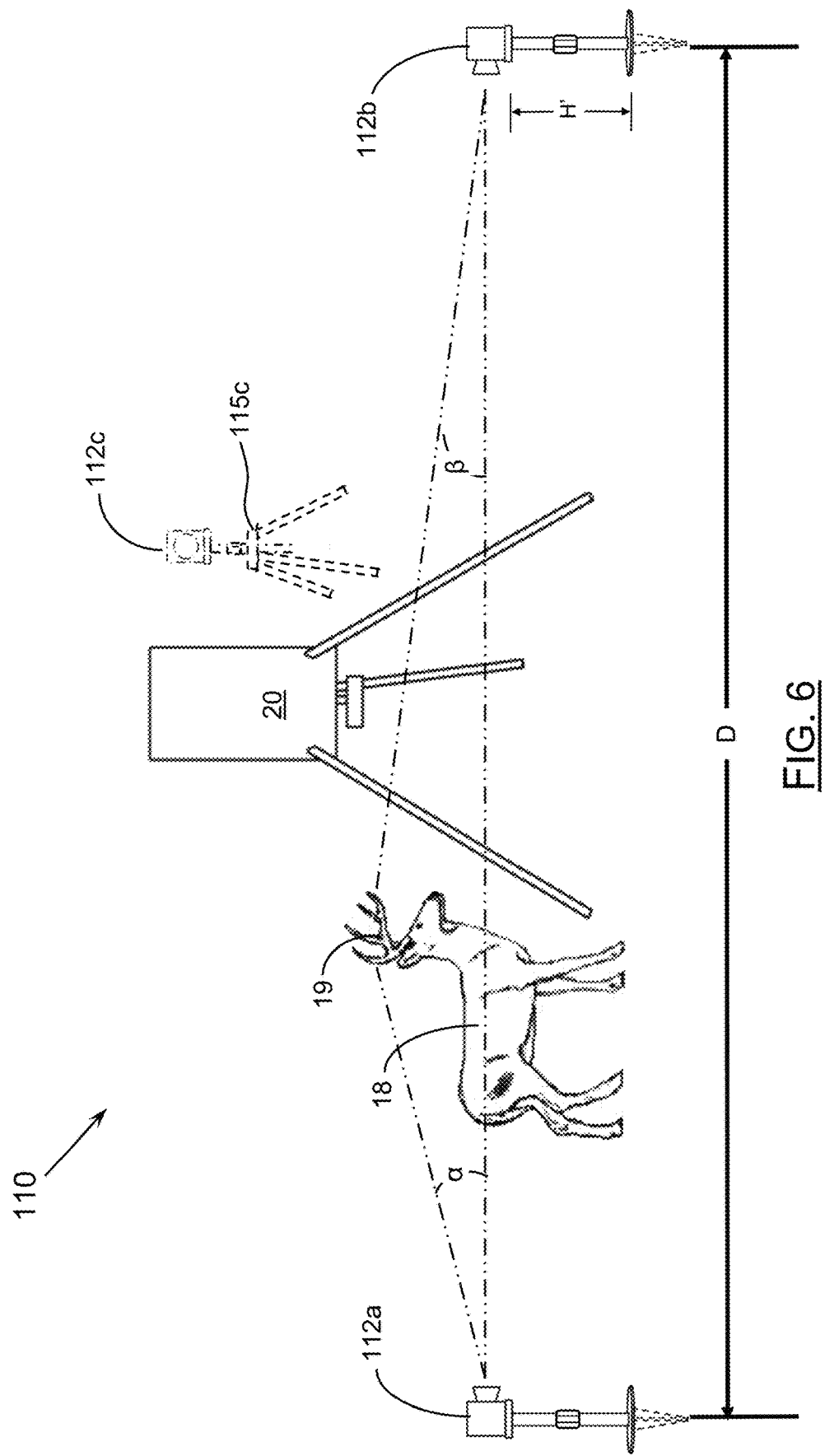
FIG. 6 illustrates a perspective view of various components of a second preferred embodiment designated as system 110 as operatively deployed for monitoring a target 18, preferably a whitetail deer, and any other deer in the vicinity of a game feeder 20.

Reference is made to FIG. 6 showing one example of a second preferred embodiment of system 110, particularly illustrating its various components. It is contemplated that at least two motion-activated game cameras 112a, 112b can be used for capturing video and/or still images of a target 18 crossing the line of sight or field of view of each of cameras 112a, 112b. Cameras 112a, 112b are preferably high-resolution digital cameras, capable of capturing still images and/or video images.

Spaced configurations of cameras 112a, 112b are such that the distance "D" between them is a known value, as well as any angle of departure between cameras 112a, 112b and any stationary objects in the vicinity, including but not limited to target 18, such angles being represented by angle α and angle β in FIG. 6. Furthermore, the angle at which each camera 112a, 112b is positioned relative to one another should also be of a known value. In other alternative embodiments of system 110, a third camera may be used, as represented by camera 112c shown in dash line in FIG. 6. Still other embodiments may employ more than three cameras, again where the distance and angles between each of the cameras in relation to the others are known, as well as the distances and angles between each of the cameras and other fixed points with the field of view of the cameras.

Figure 7:
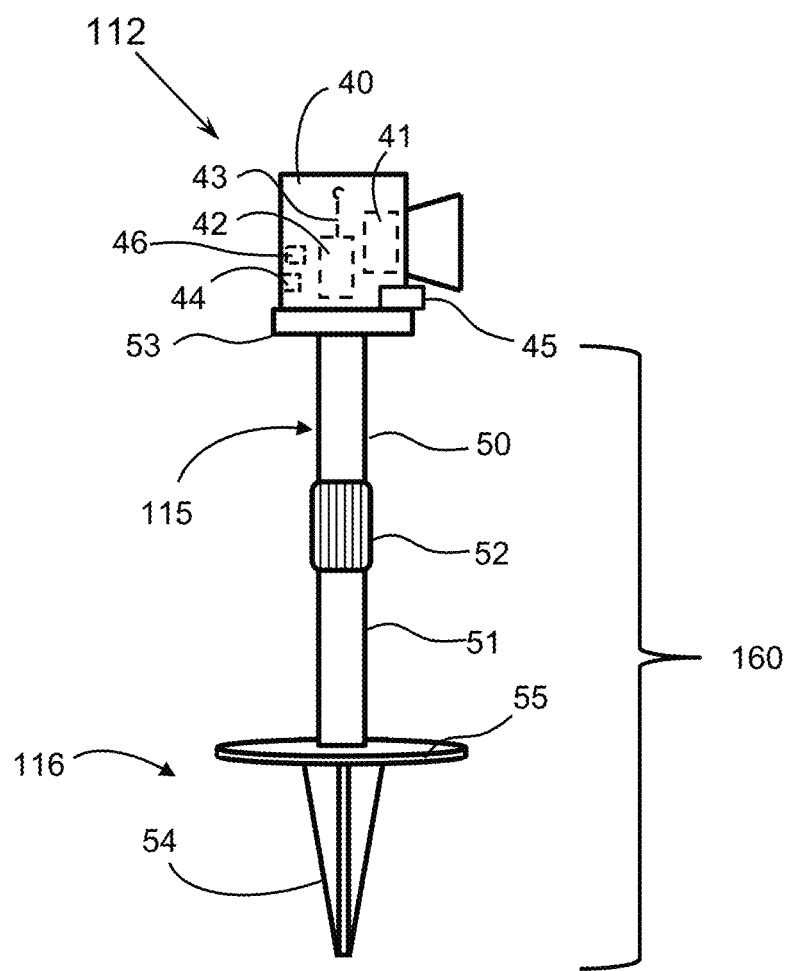
FIG. 7 is an enlarged view of a camera element 112, which is representative of each of the three camera elements 112a, 112b, and 112c as shown in FIG. 6 including an example of a mounting system.

As shown in FIG. 6, and more closely in FIG. 7, cameras 112a, 112b are mounted above the ground at a particular and known height, represented by H', utilizing upright poles or stakes 115a, 115b. Stakes 115a, 115b preferably have a spike portion 116a, 116b, respectively, which can be inserted into the ground at least one foot under the surface for maintaining stability and positioning of cameras 112a, 112b. Alternative embodiments may employ other mounting systems such as tripod 115c shown in dash line with camera 112c mounted thereon. Each of cameras 112a, 112b are preferably arranged in a configuration for capturing usable images of a target 18, wherein target 18 may be an antlered game animal of the Cervidae family, most preferably whitetail deer. Target 18 may also be horned members of the Bovidae family which include antelope.

Ideally, cameras 112a, 112b are located in a particular area where game animals are drawn, for example within proximity of a game-feeding device such as a game feeder 20, as shown in FIG. 6. In other embodiments, cameras 112a, 112b may be mounted on mounting brackets, with the mounting being further mounted on another fixed object such as a nearby tree or even mounted directly on feeder 20.

Cameras 112a, 112b, perform by capturing still images and/or video images of target 18. The capture of multiple images is preferred for providing a more accurate image representation for use in subsequent modeling, as explained in more detail herein. Since cameras 112a, 112b are motion-activated, when target 18 crosses into the field of view of one or preferably both of cameras 112a, 112b video and/or multiple still images can be captured. Preferably, the captured images include multiple angles and more than one side of target 18 to provide a more detailed view of target 18, particularly of antlers 19 of target 18. Such captured images can then be used to develop a 3-D data model of target 18 in real time or practically real time, more particularly the antlers (i.e., "rack") or horns of target 18, for the purpose of evaluating the antlers or horns in order to develop a score. As described above with respect to the preferred embodiment of system 10, such score results from the use of a scoring system such as the Boone and Crockett Club® scoring system or other similar scoring system for whitetail deer or other antlered or horned animals, as previously indicated.

Placement of cameras 112a, 112b (and 112c, if used) preferably results in multiple images capturing all sides of target 18 which, in turn, can provide a multitude of data or image points from which to build a data model of the entire rack of antlers 19. Multiple data or image points are preferred for ultimately generating a more accurate 3-D data model of the rack for scoring purposes. Having a large number of image points over multiple images facilitates the matching of such image points between the multiple images which helps with reconstructing the 2-D images into a 3-D model. Data or image points represent a single point or pixel on a digital image which in turn represents a singular point on the surface of target 18.

It is possible, even likely given that cameras 112a, 112b are preferably motion-activated, that target 18 may be in motion when cameras 112a, 112b are capturing images thereof. If target 18 is moving while images are being captured, blurring of the images may result. Additionally, if multiple images are captured and target 18 has moved between images, this could result in misalignment of the images. In order to minimize these potential problems, cameras 112a, 112b preferably operate with a fast shutter speed and/or a narrow flash pulse which helps to negate motion blurring.

Turning now to FIG. 7, there is shown camera element 112, along with various components thereof. Camera element 112 is representative of each of cameras 112a, 112b, and 112c as shown in FIG. 6. It should be understood that many, if not all, of the components of camera element 12 can be the same as those components described with reference to camera element 12 as illustrated in FIG. 2. Accordingly, the same reference numbers are used for those internal and external features of camera element 112 as are used in the description of camera element 12.

Preferred embodiments of camera element 112 may include sensor 45 which is configured for detecting movement of objects within the field of view of camera element 112 when operatively mounted in accordance with system 110 illustrated in FIG. 6. Sensor 45 can be a passive infrared (PIR) sensor which detects changes in infrared radiation based on objects passing within the field of view of camera element 112. When motion is detected by sensor 45, a signal is generated which activates camera element 112 and an image is captured. The response time between detection of motion by sensor 45 an activation of camera element 112 to capture an image is preferably between about 0.4 seconds to about 3 seconds. Recovery time, defined as the amount of time necessary for camera element 112 to be able to capture a subsequent image is preferably between about 0.5 seconds and about 5 seconds.

Also shown in FIG. 7 is one example of a mounting system for mounting camera element 112. Included in this example is a vertical mounting stand or monopod 160 which includes stake 115 and spike 116. Camera 112 is then removably mounted onto the top of monopod 160. Known methods and systems for mounting a camera to a stand (not shown) are contemplated including, but not limited to, a threaded screw-type connector on mount plate 53 which is inserted and screwed into a threaded screw receiver on the base of the camera, tripod collars, clamps, etc.

In some embodiments, stake 115 is extendible to adjust the overall height at which camera 112 is positioned once mounted. For these embodiments, stake 115 consists of two pieces, a top portion 50 and a bottom portion 51. Top portion 50 has a slightly smaller outer diameter as compared to the inner diameter of bottom portion 51 so that top portion 50 fits within bottom portion 51. Once a user selects a suitable height for camera 112, top portion 50 may be secured in position with respect to bottom portion 51 using locking collar 52. In other embodiments, stake 115 may be a telescoping pole allowing for adjusting the height at which camera 112 is positioned. In still other embodiments, stake 115 is a single continuous mounting pole having a fixed length.

In preferred embodiments of system 110, spike 116 is shaped for ready insertion into the ground. Preferably, the length of the ground penetrating portion 54 of spike 116 is at least one foot in length for providing stability to monopod 160. Spike 116 is shown in FIG. 7 to include mounting base 55 which is generally a horizontal planar section which helps to prevent insertion of stake 115 deeper in the ground than the length of ground penetrating portion 54. Spike 116 may be composed of metal, plastic, or any suitable combination thereof.

It is contemplated that rather than mounting two or more cameras as described, each on a separate mounting system, a single camera could be mounted on accordingly wherein the single camera is capable of capturing 3-D images without a need for generating a 3-D data model.

It should be understood that commercially available digital cameras, including motion-activated cameras where appropriate, may be used in the context of the disclosed systems. Furthermore, known algorithms which are capable of performing the necessary steps in the reconstruction of 3-D data models from 2-D images may be employed in the presently disclosed systems.

Although the present invention has been described in terms of the foregoing disclosed embodiments, this description has been provided by way of explanation only, and is not intended to be construed as a limitation of the invention. Even though the foregoing descriptions refer to embodiments that are presently contemplated, those of ordinary skill in the art will recognize many possible alternatives that have not been expressly referenced or even suggested here. While the foregoing written descriptions should enable one of ordinary skill in the pertinent arts to make and use what are presently considered the best modes of the invention, those of ordinary skill will also understand and appreciate the existence of numerous variations, combinations, and equivalents of the various aspects of the specific embodiments, methods, and examples referenced herein.

Hence the drawing and detailed descriptions herein should be considered illustrative, not exhaustive. They do not limit the invention to the particular forms and examples disclosed. To the contrary, the invention includes many further modifications, changes, rearrangements, substitutions, alternatives, design choices, and embodiments apparent to those of ordinary skill in the art, without departing from the spirit and scope of this invention, as defined by any claims included herewith or later added or amended in an application claiming priority to this present filing. For instance, those skilled in the art will recognize modifications to utilize a single monitoring station with binocular lenses or the like, or other variations that might utilize or accommodate infrared imaging or other distance sensing techniques or the like, rather than stereoscopic or multiscopic light images as such.

Those of skill in the art will also recognize that the foregoing teachings can also be adapted for use in monitoring the size and scoring of antlers or horns or other characteristics of trophy species other than whitetail deer. The embodiments described have been chosen as exemplary of the types of multi-camera configurations that allow for the capture of still and/or video images for reconstruction into 3-D data models for determining the dimensions for scoring whitetail deer as described in the present disclosure. Such modifications, as to multiple-lens camera devices, position-determining algorithms, and many other operational aspects of the present invention, do not necessarily depart from the spirit and scope of the invention.

Accordingly, in all respects, it should be understood that the drawings and detailed descriptions herein are to be regarded in an illustrative rather than a restrictive manner, and are not intended to limit the invention to the particular forms and examples disclosed. Rather, the invention includes all embodiments and methods within the spirit and scope of the invention as claimed, as the claims may be amended, replaced or otherwise modified during the course of related prosecution. Any current, amended, or added claims should be interpreted to embrace all further modifications, changes, rearrangements, substitutions, alternatives, design choices, and embodiments that may be evident to those of skill in the art, whether now known or later discovered. In any case, all substantially equivalent systems, articles, and methods should be considered within the scope of the invention and, absent express indication otherwise, all structural or functional equivalents are anticipated to remain within the spirit and scope of the presently disclosed systems and methods. The invention covers all embodiments within the spirit and scope of such claims, irrespective of whether such embodiments have been remotely referenced here or whether all features of such embodiments are known at the time of this filing.

I claim:

1. A multiscopic game camera system for scoring whitetail deer antlers, the multiscopic game camera system comprising:
   a) a camera operable to capture images, wherein the images captured are two-dimensional (2-D) images of whitetail deer antlers, the camera comprising a digital camera, wherein the images captured by the camera are correlated from different vantage points incrementally over time, and wherein consecutively capture images overlap, wherein the overlap is at least 50%;
   b) an unmanned aerial vehicle (UAV) onto which is mounted the camera, wherein the UAV is adapted to move to different positions during its flight to enable the camera to capture the 2-D images of the whitetail deer antlers from different angles, and a flight path is selected using waypoints;
   c) a mounting system configured for mounting the camera to the UAV wherein the mounting system is further configured to stabilize the camera;
   d) a processor associated with the camera;
   e) a position sensor mounted to the UAV, wherein the position sensor is configured to determine a distance between the unmanned aerial vehicle and the whitetail deer antlers, wherein the distance aids with determining depth and scale for calculating a plurality of measurements of distinct portions of the whitetail deer antlers;

f) the processor being adapted to convert the 2-D images captured by the camera into a three-dimensional (3-D) data model, wherein the processor is further adapted to:
  1) recover calibration parameters of the camera;
  2) match image points between consecutively captured images; and
  3) reconstruct the matched image points to generate the 3-D data model; and g) the processor, using the 3-D data model, being further adapted to determine the plurality of measurements of distinct portions of the whitetail deer antlers, the measurements being those that are used for scoring the whitetail deer antlers, and the processor being further adapted to calculate a score for the whitetail deer antlers based on the plurality of measurements.

2. The multiscopic game camera system as defined in claim 1, wherein there is at least a 60% overlap between consecutive images.

3. The multiscopic game camera system as defined in claim 1, wherein the calibration parameters comprise:
  a) X-coordinate of a center of projection;
  b) Y-coordinate of the center of projection;
  c) focal length;
  d) aspect ratio; and
  e) angle between optical axes.

4. The multiscopic game camera system as defined in claim 3, wherein the processor is adapted to calculate the scale using the focal length of the camera and the distance determined by the position sensor.

5. The multiscopic game camera system as defined in claim 1, wherein the flight path comprises a serpentine pattern.

6. The multiscopic game camera system as defined in claim 1, wherein the flight path comprises a spiral pattern.

7. The multiscopic game camera system as defined in claim 1, wherein the mounting system comprises a three-axis gimbal.

8. The multiscopic game camera system as defined in claim 1, further comprising a memory device associated with the camera, the memory device being adapted to store the 2-D images captured by the camera.

9. The multiscopic game camera system as defined in claim 1, further comprising a wireless antenna associated with the camera, the wireless antenna being adapted to send and receive wireless signals including data signals.

10. A method for scoring whitetail deer antlers using a camera mounted to an unmanned aerial vehicle (UAV), the method comprising:
  a) capturing, via the camera, two-dimensional (2-D) images of whitetail deer antlers, wherein the 2-D images are captured during flight of the UAV, the UAV being adapted to move to different positions during its flight to enable the camera to capture the 2-D images from different angles, and wherein consecutively captured 2-D images overlap by at least 50%;
  b) recovering, via a processor, calibration parameters of the camera;
  c) matching, via the processor, a plurality of image points between the consecutively captured 2-D images;
  d) determining, via a position sensor, a distance between the UAV and the whitetail deer antlers;
  e) calculating, via the processor, a scale and a depth using the distance determined by the position sensor;
  f) constructing, via the processor, a three-dimensional (3-D) modeal using the matched image points;
  g) determining, via the processor, a plurality of measurements of distinct portions of the whitetail deer antlers based on the 3-D model; and
  h) calculating, via the processor, a score for the whitetail deer antlers based on the plurality of measurements of distinct portions of the whitetail deer antlers.

11. The method as defined in claim 10, wherein the consecutively captured images overlap by at least 60%.

12. The method as defined in claim 10, wherein the calibration parameters comprise:
  a) X-coordinate of a center of projection;
  b) Y-coordinate of the center of projection;
  c) focal length;
  d) aspect ratio; and
  e) angle between optical axes.

13. The method as defined in claim 12, wherein the scale is calculated using the focal length of the camera and the distance determined by the position sensor.

14. The method as defined in claim 10, wherein a flight path of the UAV is selected using waypoints.

* * * * *